US006438529B1

(12) United States Patent
Thiel

(10) Patent No.: US 6,438,529 B1
(45) Date of Patent: Aug. 20, 2002

(54) METHOD FOR OPERATING A POSTAGE METER AND ADDRESSING MACHINE

(75) Inventor: Wolfgang Thiel, Berlin (DE)

(73) Assignee: Francotyp-Postalia AG & Co., Birkenweder (DE)

(*) Notice: Subject to any disclaimer, the term of this patent is extended or adjusted under 35 U.S.C. 154(b) by 0 days.

(21) Appl. No.: 09/266,824

(22) Filed: Mar. 12, 1999

(30) Foreign Application Priority Data

Mar. 18, 1998 (DE) ........................................ 198 12 902

(51) Int. Cl.[7] ................................................ G06F 17/00
(52) U.S. Cl. .......................................... 705/62; 705/408
(58) Field of Search .......................... 705/62, 404, 408, 705/410, 60; 380/51; 101/91; 235/468, 375, 382, 495

(56) References Cited

U.S. PATENT DOCUMENTS

| | | | | | |
|---|---|---|---|---|---|
| 4,725,718 | A | * | 2/1988 | Sansone et al. | 235/495 |
| 4,757,537 | A | | 7/1988 | Edelmann et al. | 380/51 |
| 4,831,555 | A | | 5/1989 | Sansome et al. | 358/1.14 |
| 4,868,757 | A | | 9/1989 | Gil | 705/46 |
| 4,900,905 | A | | 2/1990 | Pusic | 235/381 |
| 5,025,386 | A | | 6/1991 | Pusic | 700/227 |
| 5,200,903 | A | | 4/1993 | Gilham | 705/408 |
| 5,257,197 | A | | 10/1993 | Günther et al. | 705/406 |
| 5,319,562 | A | * | 6/1994 | Whitehouse | 705/403 |
| 5,384,886 | A | * | 1/1995 | Rourke | 707/523 |
| 5,467,709 | A | | 11/1995 | Salomon | 101/93 |
| 5,606,507 | A | * | 2/1997 | Kara | 705/410 |
| 5,611,630 | A | | 3/1997 | Dolan et al. | 400/120.09 |
| 5,682,427 | A | * | 10/1997 | Seestrom | 380/51 |
| 5,812,991 | A | * | 9/1998 | Kara | 705/410 |
| 6,005,945 | A | * | 12/1999 | Whitehouse | 380/51 |
| 6,101,156 | A | * | 1/2000 | Block | 281/2 |
| 6,157,919 | A | * | 5/2000 | Cordery et al. | 705/60 |
| 6,182,566 | B1 | * | 2/2001 | Kubatzki et al. | 101/93 |
| 6,208,980 | B1 | * | 3/2001 | Kara | 705/408 |
| 6,233,565 | B1 | * | 5/2001 | Lewis et al. | 705/35 |

FOREIGN PATENT DOCUMENTS

| | | |
|---|---|---|
| DE | PS 196 05 015 | 3/1997 |
| EP | 0 194 662 | 9/1986 |
| EP | 0 360 225 | 3/1990 |
| EP | 0649119 | 4/1995 |
| EP | 0737945 | 10/1996 |
| WO | WO-00/22602 A1 * | 4/2000 |

OTHER PUBLICATIONS

Kolouthros, Yvonne; Product Annoucement; Jan. 6, 1998; PC Magazine v17, n1 p36, dialong abstract.*

* cited by examiner

*Primary Examiner*—James P. Trammell
*Assistant Examiner*—Thomas A. Dixon

(57) ABSTRACT

A method for operating a postage meter and addressing machine includes request steps for entering at least a shipping destination address, a step for generating the print image for the address field and a step for starting the printout of the address. By nesting information processes and motion processes in intervening steps before the printing of the franking image, a time-optimized executive sequence is achieved overall when printing the address and the franking image.

7 Claims, 3 Drawing Sheets

METHOD FOR OPERATING A POSTAGE METER AND ADDRESSING MACHINE

BACKGROUND OF THE INVENTION

1. Field of the Invention

The present invention is directed to a method for operating a postage meter and addressing machine of the type including steps for entering a postage value, steps for comparing a print image, and steps for starting and completing printing of the print image. The method is suited for a "closed" system, particularly for individual users of postage meter machines.

2. Description of the Prior Art

Conventionally, franking and addressing have been mainly implemented by separate machines. The franking imprint, which is usually to be applied to a filled envelope, requires a specific printing technology that is not suited for address printing. For applications wherein envelopes are to be both franked and addressed by machine, the use of two separately operating machines in the mail output processing is a considerable investment. Two machines also require corresponding placement areas as well as twice the maintenance outlay.

More recent postage meter machines utilize digitally operating printer units. For example, the T1000 and JetMail postage meter machines offered commercially by Francotyp-Postalia AG & Co. (Postalia, Inc. in the United States), are the first to use a thermal transfer printer and an ink jet printer, respectively. It is thus fundamentally possible also to print addresses on a filled letter, but only in the area of the franking stamp. The postal regulations of most countries prohibit printing address information at the same level on the envelope or package as the franking imprint. Printing in the address area of the envelope reserved for the address of the mail recipient using the same printhead as is used to print the franking imprint at its designated location on the envelope is not possible with such machines since the printing width of the printhead is inadequate to print at both locations.

Another obstacle for the implementation of franking imprints and address printing with the same print unit has hitherto been the requirement of the postal authorities for a specific color for the franking imprint (usually orange), often paired with a requirement for fluorescence. Franking imprints with such a color could not be copied true to the original on conventional color copiers. Until recently, this constituted a certain protection against the copying of franking imprints for illicit purposes. Due to progress that has been made in color copiers and color printers in the meantime, such a measure can no longer be considered a serious impediment to producing counterfeit, unpaid imprints.

In the context of letter distribution systems, moreover, there is a need for an optimally high-contrast color, specifically for the address printing, that should be automatically (machine) scannable with high dependability. The letter is controlled through the letter sorting system of the mail distribution centers on the basis of the scanned address data. The printing devices of conventional postage meter machines, however, only print their imprints with the postal orange color. The need for machine-readability in combination with high processing speed is met best by the color black.

Digital postage meter machines of the type described above are not absolutely secure. Future color copiers will be able to duplicate a franking imprint that can no longer be distinguished from an original imprint. Based on estimates, an annual loss of approximately $200 million is incurred by the United States Postal Service (USPS) due to fraud. The USPS has therefore compiled a specification catalog with requirements which must be met by the design of future postage meter machines (information-based indicia program IBIP) published on Jun. 13, 1996. It is proposed therein that certain data be cryptographically encoded and be printed on the letter in the form of a digital signature. Every imprint thus differs from every other imprint. The scanning of this information and the decryption thereof enables the postal authority to recognize counterfeit franking imprints. These requirements are differentiated according to the type of franking means employed to produce the imprint. An imprint wherein a specific set of franking data is involved in the encryption is proposed for stand-alone machines. At the postal side, it would become necessary—after decryption of the imprint—to implement a comparison with all previous imprints contained in a data bank. If an identical imprint is discovered by this comparison, this is a counterfeit. The outlay for a complete archiving of all imprints and the implementation of a comparison under real-time conditions, however, would be enormous.

Conventional postage meter machines, which usually only print a franking stamp in red, are also referred to as "closed systems" and, differing from what are referred to as "open systems" (PC frankers), do not incorporate the corresponding letter address into the encryption. A security module with progressive crypto-technology and a secured housing in which data of the data center can be stored, however, are still required for such "open" systems.

U.S. Pat. No. 5,200,903 (European Application 298 775) discloses a postage meter machine that prints the franking stamp as well as the address. For low mail volume, the outlay for the letter transport relative to the stationarily arranged printhead is disadvantageous. A further deficiency is that the printing of both images is to be implemented in only a single motion phase of the letter. This requires a printhead that is of a width corresponding to the widths of the two images of the franking stamp and the address field and the space lying therebetween. This is already 10 cm given a standard letter and up to 20 cm given other letter formats. A correspondingly wide thermal printhead can in fact be fundamentally manufactured, but would be disproportionately more expensive than a standard head of approximately 3–6 cm. Such widths cannot be implemented at all in ink jet printhead technology in the foreseeable future for manufacturing related reasons (yield). Another factor is that a constant spacing from the printing surface is required for an ink jet printhead and this would be a problem to maintain over a wide area, given the generally uneven surface of a filled envelope.

German OS 196 05 015 discloses an apparatus for printing on a print medium standing on edge, wherein two recesses are contained in a guide plate, one for the franking imprint and one for the address printing. The printhead can be adjusted between the two recesses. Even when the adjustment of the printhead is initiated immediately after the first print image was produced, a certain time passes until the printhead has assumed its second position. During this time, however, the letter continues to move, so that only a very limited letter length is available for the second imprint. Print images which overlap in the vertical direction are generally excluded from this solution.

U.S. Pat. No. 4,868,757 likewise discloses a solution for printing a franking stamp and address field with one printer unit. The letter is automatically drawn into the printing station. After assuming its printing position, the printhead is automatically lowered onto the letter surface until physical contact has been produced. The printhead is arranged so as to be movable in a direction in order to be able to reach the entire print field. The outlay for the automatic letter draw-in is a disadvantage of this solution. The use of an ink jet printhead is also precluded, again because an ink jet printhead requires a nearly constant distance of the printhead nozzles from the letter surface, even if the letter surface exhibits considerable irregularities. The franking imprint, moreover, is not counterfeit-proof.

In U.S. Pat. No. 5,025,386, an envelope is not only transported in one direction but also a printhead is moved back and forth in the same direction and opposite thereto in order to print a line within a window. The printing device must be orthogonally adjusted for printing a further line.

Orthogonal adjustment capability of a printhead without requiring a constant back and forth movement of the printhead for line printing was already disclosed in U.S. Pat. No. 5,467,709. For the printing itself, the printhead dwells in a first printing position while the envelope is transported with a transport mechanism. A second printing position, however, is only approached for alternative printing on franking tapes. Printing of franking and address data on an envelope does not occur with such a postage meter machine. The letter transport mechanism needed in addition to the adjustment mechanism, and without which the printing would be impossible is disadvantageous.

The techniques which are standard in commercially obtainable ink jet printers, particularly the shuttle principle for the back and forth motion of the printhead in the x-direction, were united with a postage meter machine without a letter transport mechanism in U.S. Pat. No. 5,611,630. By means of an eccentrically positioned carrier rod, a slight lift in the y-direction can be exerted on the printhead in order to print a second print frame with an offset of half a dot spacing. This technique is time-consuming during printing and, moreover, is not suited for additionally printing in a second print position, for example a mailing address, at a greater distance from the first.

German PS 40 18 166 discloses a franking module for a personal computer for users with low mail volume, the franking module, which allows franking as well as addressing of envelopes, being arranged in an envelope-receiving slot of a drive insert. Such a franking module is surrounded by a secured housing and has the same circuitry as a postage meter machine wherein the letter transport means is eliminated. By utilizing the franking module, the debiting of the franking and the printing of the franking stamp image cannot be externally manipulated. The address data are read from a memory administered by a personal computer and are supplied to the franking module via the internal information routing network. Such a franking module can only be operated in combination with the personal computer and is not suited for use in a stand-alone machine. Moreover, only a standard envelope fits into the delivery slot. The printing mechanism itself is not disclosed in German PS 40 18 166. Given a digital printing process, it cannot be determined with certainty whether the printed franking stamp image is merely an unpaid copy of an earlier imprint that was combined with a desired, other address.

SUMMARY OF THE INVENTION

An object of the present invention is to provide an economical stand-alone machine for lower mail volumes wherein the functions of franking and addressing outgoing mail are united in one machine and wherein the use of an inexpensive ink jet printhead is enabled. Both imprints should ensue directly on the letter surface. The solution should also assure a constantly good print quality for filled letters with an uneven surface. The operation of the machine should be controlled such that the processing time is minimized.

The security of the franking imprint against fraudulent manipulation should meet the (expected) future, strict demands of the postal authorities and should simultaneously enable a low-outlay verification of the genuineness of every imprint.

Inventively, a prompt to enter a shipping destination address, generation of the print image for the address field, starting of the printout of the address and control of the information processes for generating a security imprint ensue parallel in time with specific motion sequences of the printhead. The motion sequences of the printhead include the executive sequences when printing the address and/or the executive sequences when positioning the printhead preceding the printing. The information processes particularly relate to a generation of a digital signature. The digital signature is implemented before the printing of the franking stamp image parallel in time to the first output of the printout of the address and corresponding motion sequences of a printhead, so that a time-optimized execution is achieved overall when printing the address and the franking stamp image.

A microprocessor processes further functions or tasks in a time-nested manner during the time span from the start to the completion of the printout of the shipping destination address, as may be needed in preparation for the printing of the franking stamp image.

DESCRIPTION OF THE PREFERRED EMBODIMENTS

Figure 1A:
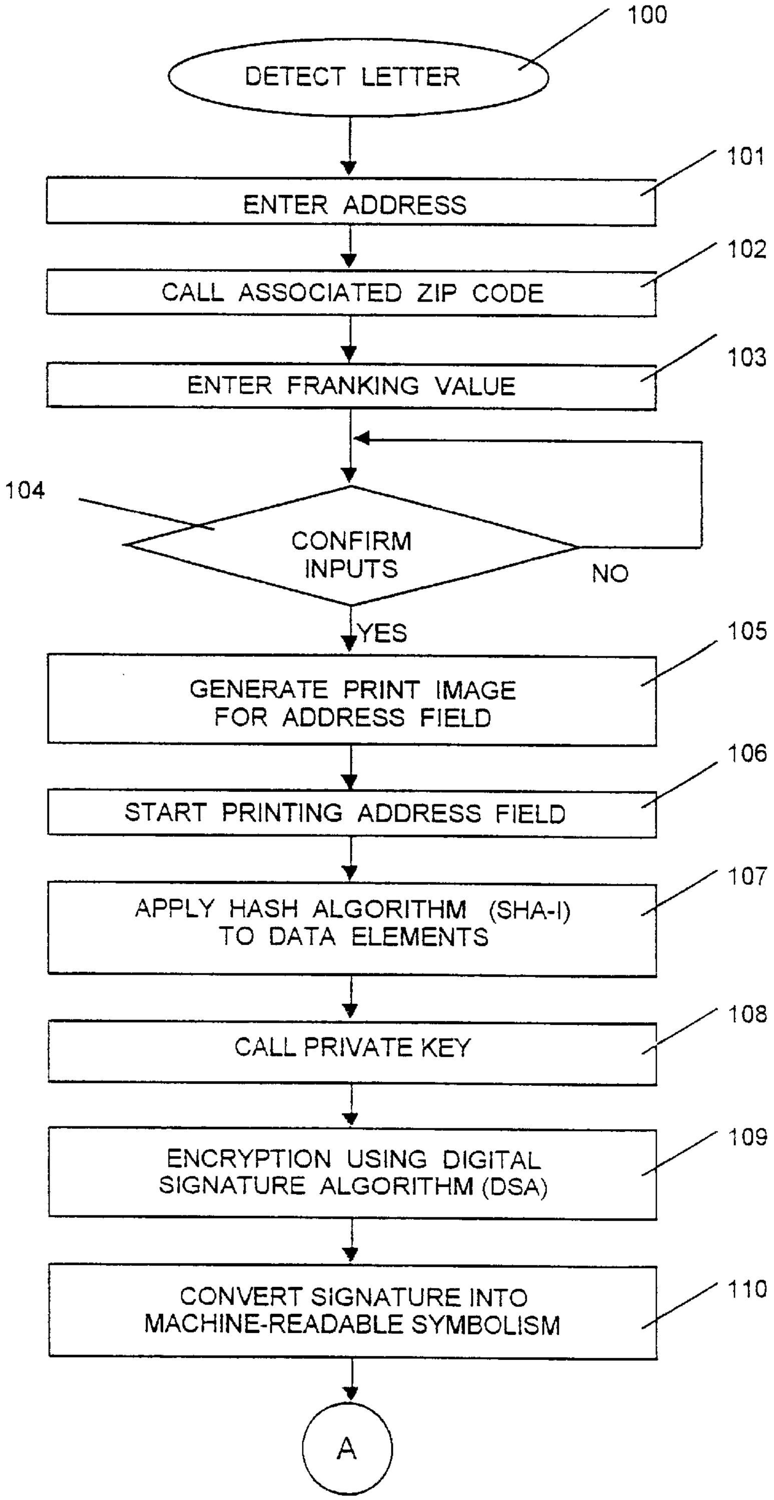
FIGS. 1*a* and 1*b* together form a flowchart for a time-optimized control of a printing procedure in accordance with the invention.
Figure 1B:
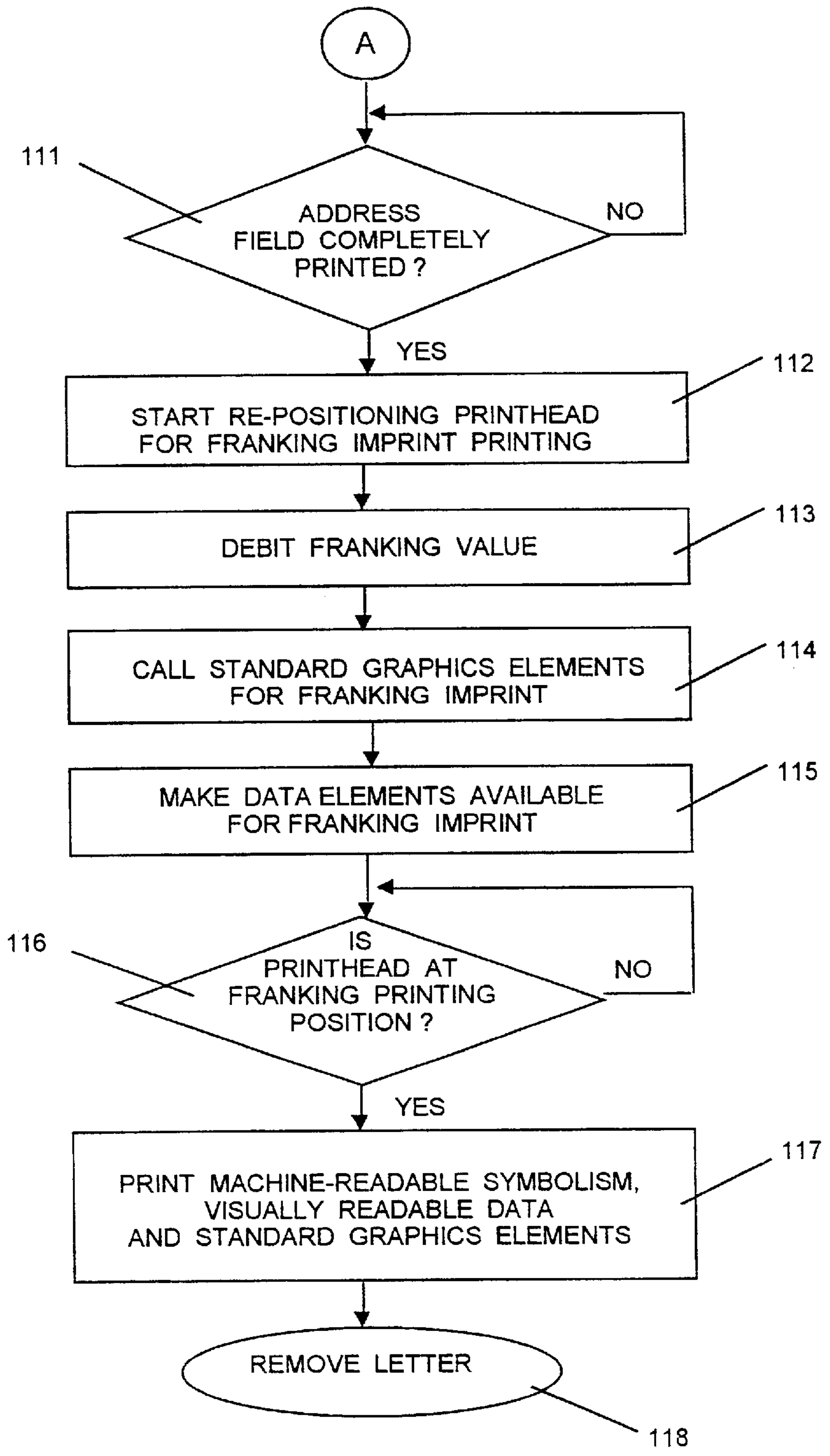
Figure 2:
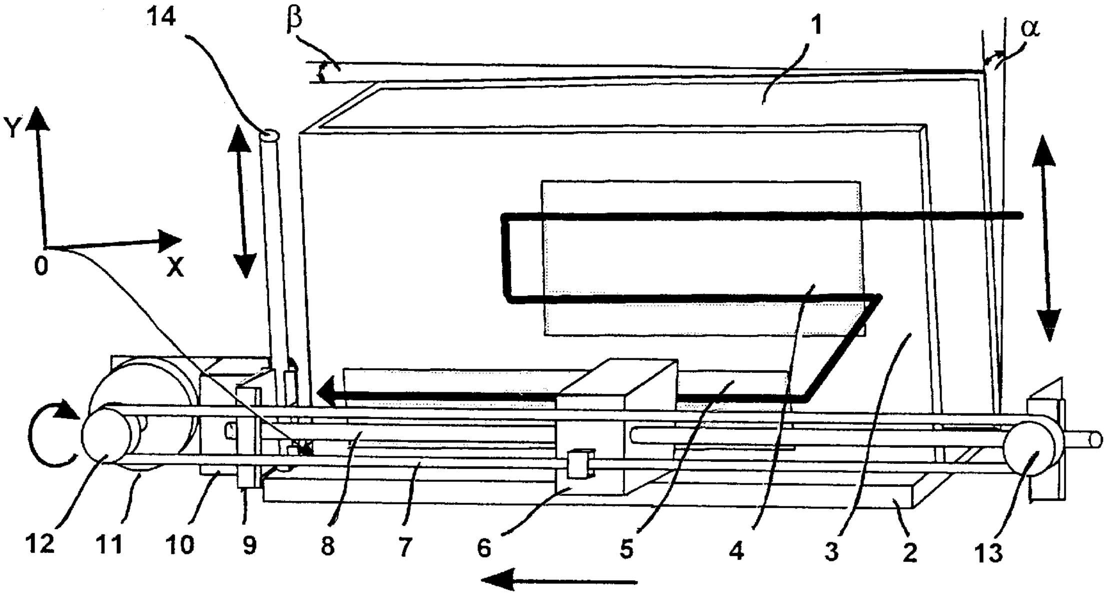
FIG. 2 is a front view of a postage meter machine printer mechanism for implementing the inventive method.

FIGS. 1*a* and 1*b* show a flow chart of a time-optimum control of a postage meter machine printing mechanism, schematically shown in a front view in FIG. 2. A letter (not shown) standing on edge can be inserted into a holder 2 in a delivery slot 1. The holder 2 is inclined at an angle α relative to the vertical and an angle β relative to the horizontal. As an example of an imprint on a piece of mail, the printing side of an envelope is shown in plan view in FIG. 3. This letter exhibits a franking imprint in a franking field and a shipping address imprint in an address field. For addressing and franking, this letter is inserted into the aforementioned delivery slot 1 in the aforementioned delivery position, rotated by 180°. As a result of the inclination tube by the angle α, the guide plate 3 of the holder 2 is also inclined by the angle α relative to the vertical. The printing side thus lies against the guide plate 3 when the edge of the letter arrives at detent at the floor of the holder 2. Due to the inclination of the holder 2 or at least the inclination of the floor of the holder 2 at the angle β relative to the horizontal, the original right upper edge of the letter slides, under the influence of the force of gravity, into a predetermined corner of the holder 2, this comer corresponds to a coordinate origin of an imaginary set of x-y coordinate axes, with the x-y plane being parallel to the guide plate 3.

Sensors, for example, light barriers that detect the presence of a letter are arranged in the inside of the holder 2 in the letter slot 1. Windows 4 and 5 for the fields (address field, franking field) to be printed on the printing side of the envelope are disposed in the guide plate 3. An ink jet printhead 6 sliding on a guide rod 8 is connected to a belt 7. The belt 7 proceeds around a drive roller 12 and a deflection roller 13. The ink jet printhead 6 thus can be moved in the x-direction and opposite thereto in a known way with the drive roller 12, driven by a drive motor 11. A retainer plate 9 that moves on a second guide rod 14 is connected to a second drive 10. The details thereof have not been separately shown since the second drive 10 can be fashioned in a known way. The second drive 10 can be, for example a motor with a gearing and with gearwheel that meshes with teeth of the guide rod 14, which can be fashioned as a toothed rack. This second mechanism can move the first mechanism, including the ink jet printhead 6, in the y-direction and opposite thereto into an alternative printing positions. The first printing position and the alternative printing position can overlap in the x-direction. An overlap in the y-direction is not provided since this is precluded by postal regulations in force.

In the illustrated exemplary embodiment, the ink jet printhead 6 is moved with the aforementioned postage meter machine printing mechanism in an approximately serpentine-like path in order to implement the printing in a time-optimized manner. The address field is thereby traversed first opposite the (positive) x-direction before an offset of the ink jet printhead 6 opposite the (positive) y-direction is required, in order to subsequently traverse the address field in the x-direction. Printing is carried out in both motion phases opposite the x-direction and in the x-direction. After a further offset of the ink jet printhead 6 opposite the y-direction, the franking field is again traversed opposite the x-direction and printing takes place in the franking field. Given further offset, a motion can be additionally accomplished again opposite the x-direction in order to approach a starting position in the window 5 before the franking field is traversed.

Alternatively, the address field can first be traversed opposite the x-direction with an ink jet printhead 6 having a larger printing width before an offset of the ink jet printhead 6 opposite the y-direction is required in order to subsequently traverse the franking field in the x-direction.

The drive of the postage meter machine printing mechanism and of the ink jet printhead 6 ensues with known electronics having a microprocessor control. The microprocessor is programmed such that, proceeding from an initial position in which the ink jet printhead 6 can be positioned in order to enter into engagement with a cleaning and sealing mechanism (not shown), a time-optimum motion sequence is undertaken.

The flow chart for time-optimized control according to FIG. 1*a* shows the executive sequence while a shipping address is printed. The flow chart for a time-optimized control according to FIG. 1*b* shows the executive sequence while printing a franking imprint. Time-intensive data processing events are thereby processed by the microprocessor in a time-nested manner with certain motion phases of the printhead. A corresponding control program with which the microprocessor is programmed is stored in a read-only memory, The microprocessor is programmed by this control program so that the information transfers and exchanges for generating a security imprint are processed parallel in time with specific motion sequences of the printhead 6.

A first Step 100 in which the successful application of a letter has been detected is followed by request Steps 101, 102, 103 for input of an address (Step 101) with automatic calling of the appertaining zip code, or calling of a comparable shipping destination code (Step 102) as well as for input of the franking value (Step 103). The request steps and the automatically identified zip code can be presented via a display (not shown). The microprocessor is connected to the read-only memory, to the display and to an input unit, and determines in Step 104 whether inputs were actuated with the input unit.

When no new inputs according to at least one of the Steps 101 through 103 are required, operation can be carried out with stored values, that are to be confirmed. If such a confirmation does not ensue, a branch is made into a waiting loop. Otherwise, a branch is made from Step 104 to a Step 105 for generating the print image for the address field. Subsequently, in Step 106, the start of the printout of the address field ensues. The printout of the address field is a first job JOB1. Inventively, further time-intensive jobs JOB2, JOB3, . . . JOBx are processed in time-nested fashion with the first job. Such further jobs JOB2, JOB3, JOB4, JOB5 are shown by the Steps 107, 108, 109, 110. The Step 107 relates to the application of a hash algorithm, for example a SHA (Security Hash Algorithm) to the data elements, or a reduction (comparison) of the dataset according to a comparable mathematical function. The dataset contains the data elements generally agreed upon with the postal authorities. This dataset is limited in the reduction such that the individual data elements are no longer reproducible, but only to such an extent that modified datasets of different letters always differ. The calling of a secret key ensues in Step 108, this being referred to as a "private key" below. The private key is stored in a security module of the postage meter and addressing apparatus in a manner so that it cannot be externally read out. A known, asymmetrical encryption algorithm is also stored in the security module. The encryption is implemented in Step 109.

A suitable, known asymmetrical encryption algorithm is, for example, the digital signature algorithm (DSA), one of the elliptic curve digital signal algorithms (ECDSA) of the ELGamal algorithm (ELGA). These signature algorithms share a key pair that includes a private anti-public key. The private key is a secret write key that cannot be externally read out, and the public key functions as read key for the signature and is accessible to anyone.

A programmed processing of such an asymmetrical encryption algorithm, for example the DSA (digital signature algorithm), is still very time-consuming given a modem processor, however, it must ensue preceding the printing of the signature in the franking field. Inventively, the calculation is begun when all required data are available. The processing ensues nested in time with the printing in the address field, that is printed first and for which no processing of encryption algorithms is required. An alternative possibility is to implement the processing during the adjustment of the ink jet printhead 6 opposite the y-direction, if the postage meter machine printing mechanism operates relatively slowly. Preferably, however, the aforementioned processing is already begun before this adjustment.

For cost reasons, mail carriers require a machine readability of the printed data. This can be established by correspondingly fashioned imprints and OCR readers at the mail carrier, even given alphanumerical characters. Optionally, a conversion into a specific, machine-readable symbolism such as bar code, 2D bar code, or PDF 417 symbolism can also ensue in Step 110. The latter is disclosed in greater detail in European Application 439 682. Such two-dimensional bar codes are relatively space-saving compared to one-dimensional bar codes and further reduce the printing time.

Following the optional Step 110, a branch is made to the inquiry Step 111 shown in FIG. 1*b*. An inquiry is made as to whether the address field has been completely printed. Further inquiry steps wherein the end of other jobs is interrogated can lie between the Steps 110 and 111. The time sequence in the printhead motion for address printing is generally dimensioned such that all jobs are processed no later than the drive of the mechanism for moving the ink jet printhead in the direction toward the franking field.

The start of a repositioning is triggered in Step 112 in order to drive the ink jet printhead into the position for the franking imprint. The processing of the next job, i.e. Step 113, inventively ensues in time-nested fashion with the aforementioned positioning. In Step 113, a debiting of the franking value from the credit that is stored in the postal registers of the security module ensues. Calling of the graphic standard elements of the franking imprint subsequently ensues in the next Step 114, and the data elements for the franking imprint ire made available in a further Step 115. An inquiry is made in the following step 116 as to whether the franking position has been reached. If this is not yet the case, a branch is made into a waiting loop. Otherwise, printing of the machine-readable symbolism ensues in Step 117, as does printing of the visually readable data as well as printing of the standard graphic elements. In a terminating Step 118, the end of the processing is signaled via the display or by a beeper and a prompt is generated to remove the completely addressed and franked envelope.

Figure 3:
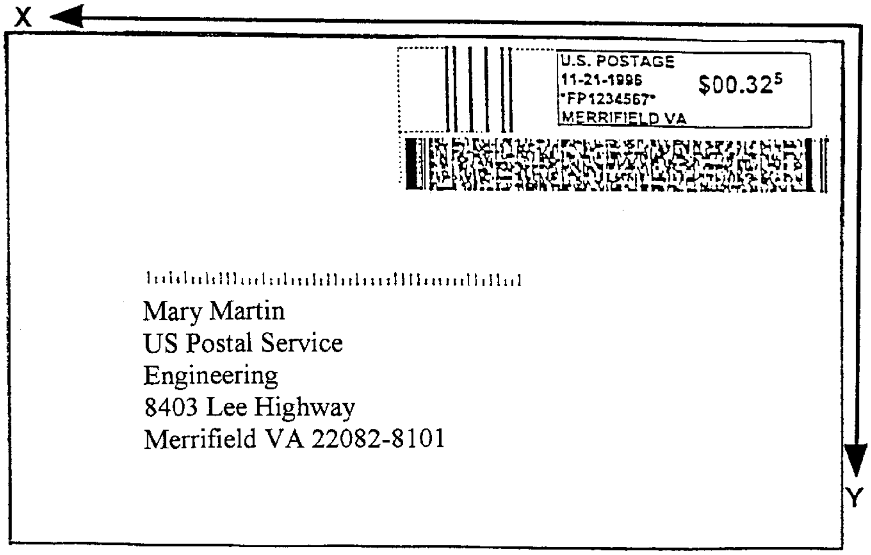
FIG. 3 shows an example of an imprint on an item to be mailed, produced according to the inventive method.

An example of a printing on a mailing item is explained with reference to FIG. 3. The address field is centrally arranged if the item is a letter. The mail recipient address is printed in clear text and an appertaining zip code is printed as an unencrypted bar code. The franking imprint is arranged at the top right in the periphery. A return address arranged at the top left in the periphery is optional. An approximately one inch wide franking imprint with a machine-readable region is generated for the USPS. Specific clear data and the signature are, for example, converted into a PDF 417 symbolism and are printed. The visually (human) readable region and a region for the FIM code according to U.S. postal regulations are arranged above the machine-readable region. Due to the FIM code, an approximately 11 through 14 mm wide, visually (human) readable region is employed for an approximately one inch wide franking imprint. The remaining width can thus be employed for the machine-readable region.

The invention is not limited to a postage meter machine printing mechanism according to FIG. 2. Thus, embodiments are also suitable wherein a horizontally-lying piece of mail is provided with an address and franking imprint.

An alternative embodiment of the inventive machine includes a letter delivery arrangement. This is composed of a slot that is as wide as the widest letter to be processed and which has an aperture width that corresponds to the maximum letter thickness to be processed. Sensors, for example, light barriers, are again arranged in the inside of the holding mechanism 2 within the letter slot, these sensors detecting the presence of a letter. A receptacle for receiving the letter is located beyond this opening and can be lifted in the vertical direction with a motor drive. A rigid plate having two recesses or clearances is arranged over the letter receptacle. These recesses are sized (dimensioned) so as to at least correspond to the printing imprint and to the addressing imprint, respectively, and are arranged in the plate at respective positions correspond to the arrangement of the two fields on the letter to be processed. The printhead is arranged immediately above the plate. The motor-driven motion of the printhead is measured, for example with an inductive path sensor. Other path sensors in the drive motor or in the gearing that measures rotation can also be employed. The measured path signals are supplied to a control electronics that synchronizes these signals with the print control signals that are sent to the printhead.

The printhead is implemented as a single-color system with, preferably, black ink. A solution that is especially beneficial in view of the usage costs is achieved by employing an ink jet printhead according to U.S. Pat. No. 5,592,203 assigned to Francotyp-Postalia AG & Co.

Instead of employing special ink, security against counterfeiting of the franking imprint is achieved by cryptographic encoding of specific data. This encryption generates a digital signature that is printed in addition to the dataset from which it was generated. Both components are printed on the envelope in machine-readable form.

The following set of data is preferably employed:

Manufacture identification data (vendor ID)
Device identification data (device ID)
Postal destination code (originally ZIP)
Date
Franking value (postage amount)
Piece Count
Check digits
Destination address The first seven data elements of the dataset make each corresponding franking imprint unique, however, comparison to data for earlier franking imprints stored in data banks is necessary for this purpose. Since these comparisons can only be implemented as spot checks for cost and equipment reasons, there is a high probability that a counterfeit will not be detected. By involving the last data element, the destination address, into the cryptographic encoding, it is possible to detect a copy as a counterfeit merely by checking the information printed on the letter and without consulting historic data. In the USA, an address is largely printed out by a numerical code, i.e., the zip code. In its expanded form as ZIP+4, it is composed of 11 digits that allow the addressee to be completely identified in many instances, or at least the building, or the immediate surroundings thereof. The 11 digits are printed on the non-envelope as a bar code in a form that is machine-readable for mail distribution systems. The inventive postage meter and addressing machine now not only prints this bar code into the address field but also involves the address represented by the corresponding digits in the encryption of the franking imprint. Two examples of an attempt at counterfeiting by copying are as follows:

a) The counterfeiter uses an authorized, original franking imprint from a letter with the correspondingly encrypted data in the franking imprint and copies this imprint. In the address field, he uses those destination addresses to which he intends to send letters. These destination addresses, however, do not correspond to the cryptographically encoded destination addresses in the original data contained in the franking imprint. This contradiction can be detected by comparing these two information sets contained on the letter, by the inspecting postal authority.

b) Just as in a), the counterfeiter uses an authorized original imprint and copies it. Differing from a), however, he also uses the same address in the address field as on the original letter. This copy can no longer be verified from the comparison of the data printed on the letter, however, there is no economic incentive to this type of counterfeiting because the copy must be automatically delivered to the same recipient as the original. Counterfeits for commercial reasons, for instance when mailing advertising information, are thus effectively precluded.

Most postal authorities do not yet have such a sophisticated address code as the USPS. For example, the DPAG in Germany currently employs a code having only five digits. Such a code would still leave adequate latitude for commercial counterfeits, for example when shipping advertising material to different households having the same five-digit zip code. In order to also be able to utilize the inventive device for such conditions, the code is expanded by involving parts of the recipient address. The name of the recipient or parts thereof are used for this purpose in a first version. The name is presented in the form of alphabetical characters. These are converted into numbers for the cryptographic encoding. For example, the initial letter of the recipient (personal name or name of a company) is filtered out and a number corresponding to the position of the letter in the latent alphabet is assigned to it. The widespread ASCII code can be used for this purpose. This number is now appended to the address code (five-place zip code) and expands this by two digits. In order to enhance the security, further letters of the name can also be converted and employed. The address code is lengthened by two digits with every further letter.

In a second version, instead of the recipient name, the street name is used for lengthening the address code. A special form would be to use the house number because the conversion into a numerical character can be eliminated in this case.

The future security standard of the USPS (IBIP) is met with the present invention and an economic combination of franking and addressing is also enabled.

There are further modified embodiments for the mechanical fashioning of the inventive solution, wherein again assumed the printhead is narrower then the field to be printed. This makes the resolution of the printing process into a number of phases necessary. Only a strip of the overall print image is printed in each phase. The executive sequence fundamentally corresponds to the first version of the above-described embodiment. The printhead is displaced by the respective width of a printing strip between the phases. To that end, the second motion mechanism (orthogonal to the first motion mechanism) is provided in the plane of the letter. When sweeping over the free interspace between the franking field and the addressing field in order to save time, the two motion devices are switched into a special mode. In this, the second motion mechanism is continuously activated until the printing position for the address field has been reached. The first motion mechanism is at a standstill for this time. In order to also be able to place the address imprint at the usual location given larger letter formats, the duration of the special mode is linked to the letter format selected by the customer. An automatic identification of the letter format with optical sensors can alternatively take place. A specific width of the free middle strip is allocated to each format in this case, this being stored in a memory of the machine. A special mode is then controlled with these stored, format-specific values.

In instances wherein the last printing position in the first field (address field) does not align with the first printing position in the second field (franking field), i.e. when there is an x-offset, a combined motion opposite the x and y directions is especially time-saving. The two independent drives are driven according to known trigonometric relationships by the microprocessor for this purpose.

For further accelerating the printing process, the printing phase itself can again be divided into two sub-phases. In the first sub-phase, the printhead moves along the letter and prints the upper half of the strip to be printed. At the end of this sub-phase, the printhead is displaced in an orthogonal direction by half the width of the print strip and the motion direction of the printhead along the letter is rotated by 180°. The lower part of the printing strip is printed during this second sub-phase.

The inventive machine is used in the following way. The letter to be franked is manually introduced into the provided slot up to a detent, and the aforementioned sensors determine the presence thereof. The machine is switched into a first mode. This can be the franking mode or the address mode (the address mode is assumed below). The customer is requested to enter the address. The address can be entered via a keyboard with which the inventive device is equipped or can be entered via a PC connected to the device via a serial interface. After the end of this input procedure, the customer is requested to enter the franking value. In an easy-to-use version, the machine is also capable of calculating the postage value from other data such as weight, size and shipping type in a known way. The address data together with other security-relevant data such as postage value, date, machine number, are cryptographically encoded and edited for printing in the franking field.

Printing is enabled after debiting the value to be franked. First, a receptacle with the letter lying thereon is raised and the letter is pressed against the stationary plate. Due to this contact pressure of the surface to be printed against a rigid, planar surface, the usual irregularities of field letters are largely compensated. The printhead disposed over the recesses thus is at a nearly constant spacing from the letter surface to be printed, regardless of the thickness and shape of the fill of the letter. This enables the employment of an economical ink jet printhead. In another version, the letter can be brought immediately into the printing position after delivery and before entering data. After the letter has assumed the printing position, the actual printing process is triggered. The printhead can thereby first print the franking field, or can alternatively print the address field first, After the end of printing, the receptacle is lowered and the letter can be manually removed.

As significant advantage of a device having the inventive features compared to the conventional solution with separate devices for franking an address labeling is reduced time and apparatus outlay. Systems known as PC frankers as disclosed, for example, in U.S. Pat. No. 5,625,694 will also be utilized in the market for mail processing. These are systems wherein the franking imprint as well as the address are applied with a standardized office printer, however, only on unfilled envelopes. Compared to these devices, the inventive solution exhibits the important advantage that the imprint of both sets of information can ensue on the already filled envelope. This filled envelope can be weighed in advance and the required postage can be exactly identified in this way. This is especially advantageous when the fill of the letter ensues with different inserts and an estimate of the weight, as is necessary given PC frankers, is too imprecise.

The method steps and the time-optimized control for a specific sequence of individual jobs were already explained on the basis of FIGS. 1*a* and 1*b*. Alternatively, of course, some other sequences possible. The printhead is in the initial position for printing the address field. The application of a letter is reported by the sensors. The operator is requested to enter the destination address of the letter. The input address is displayed with the display. The validity of the input is confirmed by the user by actuating an ENTER key. After this confirmation, the processor automatically begins to search an address data file. This data file, for example, can be stored in a chip card introduced into the machine. An address code, for example, zip code or postal routing code, is allocated to the input address. Independently of this action sequencing in the background, the user is requested to input the postage value. In an easy-to-use version, the postage value is automatically determined. To this end, the user must indicate the data that define the postage value such as letter format, letter weight and, potentially type of shipping. The input or identified postage value is displayed and confirmed by the user with the ENTER key. No further-processing ensues without confirmation of the inputs.

The print image for the address printing is generated next. The editing of the print image ensues according to the wysiwyg principle, i.e. the imprint corresponds to the address input shown on the display. The generation of the print image is immediately followed by the start command for the printout. When the printing is implemented with a printhead corresponding in width to the height of the address field, only one motion phase is required for the printing. The time required for this purpose is dependent on the printing speed of the printhead and on the length of the address field. Given a printing speed of 100 mm/s and an address field length of 80 mm, this time is approximately 1 second. At this time, the debiting of the postage value from the credit of the user is done, and the corresponding updating of the ascending, descending and account registers also is done. This is immediately followed by the generation of the visually readable part of the franking imprint. Included in this are the standard graphic elements such as the posthorn of the DPAG and data such as the date and the postage value. When these method steps have been implemented, the message for the end of the address printing is awaited.

When the address printing has ended, the printhead is driven to the position for the franking imprint immediately thereafter. In order to minimize the time for this motion, the address printing began at the left side of the address field and thus ended at the right side. From this position, the printhead is now moved onto the right-hand side of the franking field to be printed. Including the franking imprint, the printhead thus executes a motion that corresponds to a mirror-inverted Z. The angle of the diagonal is thereby dependent on the length of the address field to be printed and on the length of the franking field to be printed as well as on the selected letter format. At any rate, the machine has all information available to it at this point in time in order, via simple trigonometric functions, to move the printhead away and, thus, time-optimally into its second printing position.

When motion phases for the printing motion itself are utilized for this movement, the printhead requires approximately one second until the new printing position has been assumed, given a standard letter. In this time, the calculation of the machine-readable part of the franking imprint can be made. First, the digital signature is determined. In conformity with the information based on the indicia program of the USPS, the secure hash algorithm is applied to the aforementioned dataset. This algorithm, described in FIPS PUB 180-1, generates a 160 bit dataset. Next, the private key belonging to each machine is called. With the assistance thereof, the DSA operation is applied to the 160 bit dataset. This algorithm, described in FIPS PUB 186, generates two 160 bit datasets. These datasets are arranged in two fields each 20 bytes in size for the printing. Instead of the DSA algorithm, some other crypto-algorithm can be employed such as, for example, RSA.

The digital signature together with the dataset that generates it are converted into a machine-readable code. Since the space for such an imprint that is to be printed in common with the visually readable information is limited, a two-dimensional bar code is preferably employed. For example, the PDF 417 is such a code, described in Technical Report Monitor 8, Symbol Technologies, April 1992. When the printhead has reached its second printing position, it begins to print the franking field. If a number of motion phases of the printhead are required in order to print the entire franking field due to the limited width of the printhead, then one begins with the two-dimensional bar code arranged in the lower half. This is followed by the printout of the visually readable part of the franking field. When the entire franking field has been printed, the letter is released for removal and the user received the prompt to remove the letter.

An executive sequence that is time-optimized overall is achieved due to the multiple nesting of information processes and motion processes. Compared to a purely linear operation, the acceleration that can be achieved is approximately a factor of two. When the time for the one-time application and removal of the letter is also added, it becomes clear that the postage meter and addressing machine is not only less expensive to purchase compared to two separately functioning, specific machines but, above all else, works in a very time-saving fashion. A stand-alone postage meter machine, without the capability of also printing the address but that is to meet future security demands, would already have to scan the addresses printed onto the letters because a secure franking imprint requires the processing of this address information.

The two parts of the key pair, the private key and the public key, are generated by the manufacturer of the postage meter and addressing apparatus. The private key, which is employed for forming the digital signature for every franking imprint, is maintained in a secure memory, preferably in the security module of the machine. The public key, which serves for the verification of the digital signature by an inspection procedure of the mail carrier at an evaluation location, is stored in a data bank. This can be maintained by the manufacture and the inspection device can download the public key as needed. Alternatively, the manufacturer can immediately send the public key to a data bank that is administered by the inspection authority. The allocation of the keys of the key pair mating with one another can, for example, ensue via a machine serial number, or device identification data (device ID).

All data printed on the mail, which are needed for an interpretation at the evaluation location are centrally stored. The posted mail in the post office can be inspected using the centrally stored data to determine whether copies of an imprint are being used with fraudulent intent. An entry in the central data bank can be made in a special area for every posted piece of mail. A double entry in this data bank then indicates a counterfeit imprint. Due to the operation of the mail recipient address with the postage value and the item count via the signature, it is impossible to copy one of the two separately from one another, i.e. mail recipient address or postage value, for manipulative purposes.

Each and every key pair composed of a private key and a public key can have a limited validity in terms of time and can be suddenly changed by the data center at a specific date and time of day. The time intervals of the change can be selected according to the currently achieved progress in modem analysis methods, for example differential crypto-analysis, and are dimensioned such that an attack on the security of the system will fail with a high probability.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for operating a postage meter and addressing machine comprising the steps of:

entering a shipping destination into a processor;

entering data into said processor to make available to said processor a postage value for shipping an item to said shipping destination, said item having an address field and a franking field thereon;

compiling, using said processor, a print image containing said shipping destination;

providing a printhead which is movable relative to said item;

positioning said printhead in said address field and starting printing of said print image only in said address field on said item and executing a motion sequence by said printhead relative to said item to successively position said printhead from said address field and into said franking field;

compiling a security imprint parallel in time with execution of said motion sequence; and printing said security imprint in said franking field, together with a representation of said postage value, on said item with said printhead.

2. A method as claimed in claim 1 wherein the step of generating said security imprint comprises generating said security imprint during said printing in said address field.

3. A method as claimed in claim 1 wherein the step of generating said security imprint comprises generating said security imprint while successively positioning said printhead in said address field and said franking field.

4. A method as claimed in claim 1 wherein the step of generating a security imprint includes generating a digital signature.

5. A method as claimed in claim 4 wherein the step of generating said digital signature comprises generating said digital signature parallel in time with said printing in said address field and with successively positioning said printhead in said address field and said franking field.

6. A method as claimed in claim 5 wherein the step of generating said digital signature comprises generating said digital signature using an asymmetrical encryption method and a private key, and comprising the additional step of verifying said digital signature with an associated public key.

7. A method for operating a postage meter and addressing machine comprising the steps of:

entering input data including a postage value and at least one shipping destination into a processor; and processing said input data in said processor to initially compile a first dataset incorporating said shipping destination and printing said first dataset in an address field on an item to be shipped and, continuing processing said input data to compile a second dataset incorporating said postage value and printing said second dataset as a franking image in a franking field on said item, with compilation of said second dataset being conducted at least partially time-nested with printing of said first dataset.

* * * * *